(12) United States Patent
Leung et al.

(10) Patent No.: US 9,086,738 B2
(45) Date of Patent: Jul. 21, 2015

(54) MULTI-SURFACE OPTICAL TRACKING SYSTEM

(71) Applicant: Apple Inc., Cupertino, CA (US)

(72) Inventors: Omar Sze Leung, Palo Alto, CA (US); Matthew Last, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 13/796,502

(22) Filed: Mar. 12, 2013

(65) Prior Publication Data

US 2014/0268150 A1 Sep. 18, 2014

(51) Int. Cl.
*G01J 4/00* (2006.01)
*G06F 3/03* (2006.01)
*G06F 3/00* (2006.01)

(52) U.S. Cl.
CPC ............... *G06F 3/0317* (2013.01); *G06F 3/00* (2013.01)

(58) Field of Classification Search
CPC ................................. G06F 3/00; G06F 3/0317
USPC ............. 356/369, 364, 445; 250/559.09, 225; 359/485.01, 485.02, 246, 247, 249, 359/251, 263; 345/163–166
See application file for complete search history.

(56) References Cited

U.S. PATENT DOCUMENTS

| | | | |
|---|---|---|---|
| 4,133,404 A * | 1/1979 | Griffin | 180/169 |
| 4,289,400 A * | 9/1981 | Kubota et al. | 356/613 |
| 5,572,314 A * | 11/1996 | Hyman et al. | 356/128 |
| 5,963,332 A * | 10/1999 | Feldman et al. | 356/425 |
| 7,761,246 B2 * | 7/2010 | Matsui | 702/40 |
| 8,138,488 B2 | 3/2012 | Grot | |
| 8,368,677 B2 | 2/2013 | Yamamoto | |
| 8,441,450 B2 | 5/2013 | Degner et al. | |
| 8,525,777 B2 | 9/2013 | Stavely et al. | |
| 8,593,598 B2 * | 11/2013 | Chen et al. | 349/114 |
| 2002/0080357 A1 * | 6/2002 | Dana | 356/445 |
| 2005/0179903 A1 * | 8/2005 | Tsuruta et al. | 356/445 |
| 2006/0250377 A1 | 11/2006 | Zadesky et al. | |
| 2007/0222756 A1 | 9/2007 | Wu et al. | |
| 2008/0278445 A1 * | 11/2008 | Sweetser et al. | 345/158 |
| 2009/0002347 A1 | 1/2009 | Ming et al. | |
| 2009/0108175 A1 * | 4/2009 | Grot | 250/206.1 |
| 2011/0050573 A1 * | 3/2011 | Stavely et al. | 345/166 |

(Continued)

OTHER PUBLICATIONS

Krishnan et al., "A Miniature Surface Mount Reflective Optical Shaft Encoder," Hewlett-Packard Journal, Dec. 1996, Article 8, pp. 1-6.

(Continued)

*Primary Examiner* — Michael A Lyons
*Assistant Examiner* — Violeta A Prieto
(74) *Attorney, Agent, or Firm* — Brownstein Hyatt Farber Schreck, LLP

(57) ABSTRACT

An optical tracking device that is capable of operation on both glossy and diffuse surfaces includes at least one housing, at least one light source, and at least one sensor. The light source emits light toward a surface on which the housing is moved and the sensor receives the light emitted by the light source after it is reflected off of the surface. The light source is oriented such that the angle of incidence of the emitted light corresponds to Brewster's angle. The sensor may be also oriented such that the angle of reflection of the reflected light corresponds to Brewster's angle. The light emitted by the light source may be polarized to increase the p-polarization of the emitted light and/or the light received by the sensor may be filtered to block s-polarized portions of the reflected light.

20 Claims, 6 Drawing Sheets

(56) References Cited

U.S. PATENT DOCUMENTS

| | | |
|---|---|---|
| 2011/0141444 A1* | 6/2011 | Van De Kerkhof et al. .... 355/67 |
| 2012/0023459 A1 | 1/2012 | Westerman |
| 2012/0113044 A1 | 5/2012 | Strazisar et al. |
| 2014/0071050 A1 | 3/2014 | Armstrong-Muntner |

OTHER PUBLICATIONS

U.S. Appl. No. 61/645,033, filed May 9, 2012, 84 pages.
Epstein et al., "Economical, High-Performance Optical Encoders," Hewlett-Packard Journal Oct. 1988, pp. 99-106 [text only version].

* cited by examiner

MULTI-SURFACE OPTICAL TRACKING SYSTEM

TECHNICAL FIELD

This disclosure relates generally to optical tracking devices, and more specifically to optical tracking devices that can function on both glossy and diffuse surfaces.

BACKGROUND

Optical tracking devices, which may include optical tracking input devices such as optical computer mice, typically track movement of the respective device on a surface. Such movement may be tracked utilizing one or more sensors that detect light emitted by one or more light sources and reflected and/or diffused by the surface. However, differences in reflective and/or diffusive properties of different types of surfaces may cause problems for movement tracking when the optical tracking devices are utilized on glossy surfaces (such as glass) as opposed to diffuse surfaces (such as wood).

SUMMARY

The present disclosure discloses apparatuses and methods for operating optical tracking devices. An optical tracking device that may be capable of operation on both glossy and diffuse surfaces may include at least one housing, at least one light source, and at least one sensor. The light source may emit light toward a surface on which the housing is moved and the sensor may receive the light emitted by the light source after it is reflected off of the surface. The light source may be oriented such that the angle of incidence of the emitted light corresponds to Brewster's angle and/or the sensor may be oriented such that the angle of reflection of the reflected light corresponds to Brewster's angle. The light emitted by the light source may be polarized to increase the p-polarization of the emitted light and/or the light received by the sensor may be filtered to block s-polarized portions of the reflected light. In this way, the optical tracking device may be operated such that the intensity of the reflected light does not exceed the capability of the sensor.

In some implementations, the optical tracking devices may be manufactured to be configured as described above. However, in other implementations, various factors discussed above (such as light source and/or sensor orientation, polarization of emitted and/or received light, and so on) may be adjusted in response to detecting that the intensity of reflected light exceeds the capability of the sensor and/or is below a threshold (such as the sensor's ability to detect).

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes apparatuses and methods that embody various elements of the present disclosure. However, it should be understood that the described disclosure may be practiced in a variety of forms in addition to those described herein.

An optical tracking device that may be capable of operation on both glossy and diffuse surfaces may include at least one housing, at least one light source, and at least one sensor. The light source may emit light toward a surface on which the housing is moved and the sensor may receive the light emitted by the light source after it is reflected off of the surface. The light source may be oriented such that the angle of incidence of the emitted light corresponds to Brewster's angle and/or the sensor may be oriented such that the angle of reflection of the reflected light corresponds to Brewster's angle. The light emitted by the light source may be polarized to increase the p-polarization of the emitted light and/or the light received by the sensor may be filtered to block s-polarized portions of the reflected light. In this way, the optical tracking device may be operated such that the intensity of the reflected light does not exceed the capability of the sensor.

Figure 1:
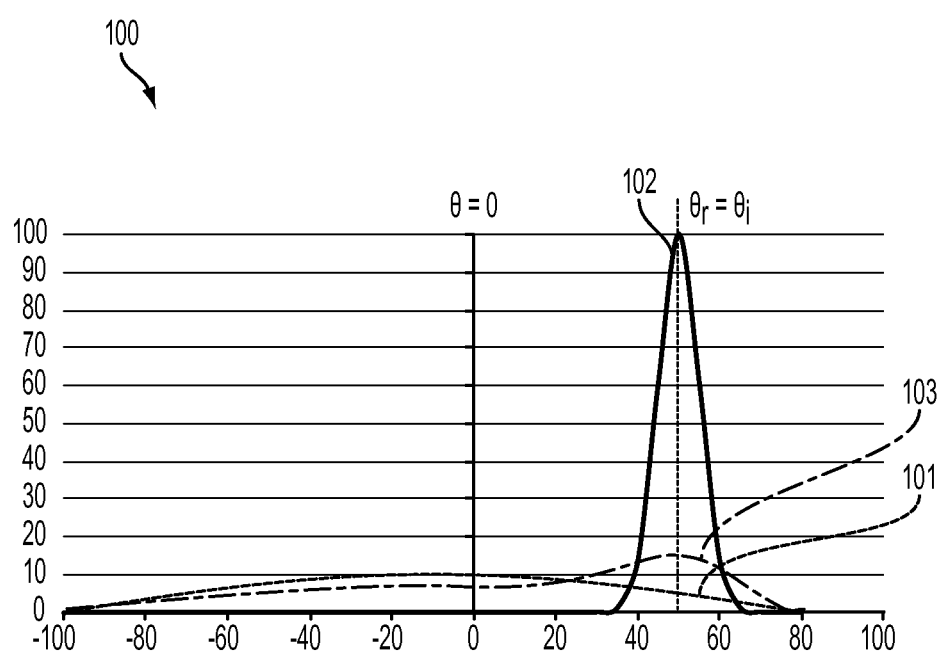
FIG. 1 is a chart illustrating intensities of diffuse and specular light reflected from glossy surfaces at different angles.

FIG. 1 is a chart illustrating intensities of diffuse 101 and specular 102 light reflected from glossy surfaces (such as glass) at different angles. As can be seen by the chart, light that is directly reflected by the glossy surface (specular light) has a much greater intensity throughout much of the possible angles at which the light is reflected off of a glossy surface than light that is diffused (diffuse light) by the glossy surface. Further, as can also be seen by the chart, the intensity of the specular light varies steeply with the angle. Large differences between the intensity of diffuse and specular light can cause the intensity of the specular light to exceed the sensing capabilities of optical tracking device sensors.

It should be noted, the intensity of specular light reflected from diffuse surfaces (such as wood) does not vary steeply with angle. As such, optical tracking devices may operate well when used on diffuse surfaces but may not be capable of operation on glossy surfaces due to the difference between the intensity of the diffuse and specular light.

Figure 2A:
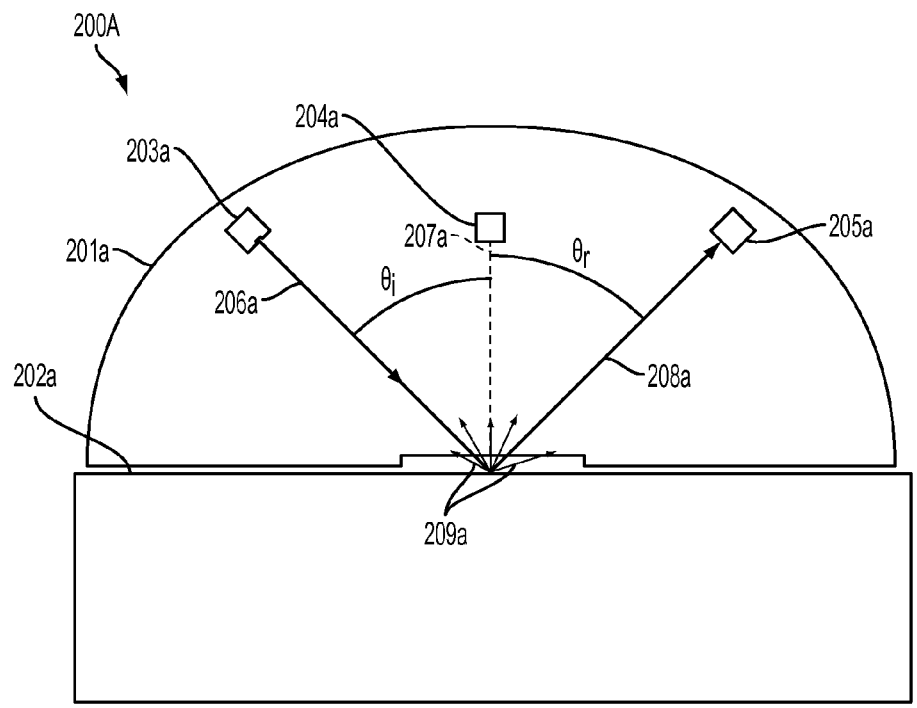
FIGS. 2A and 2B illustrate the differences between an optical tracking device operating on a glossy surface and a diffuse surface.
Figure 2B:
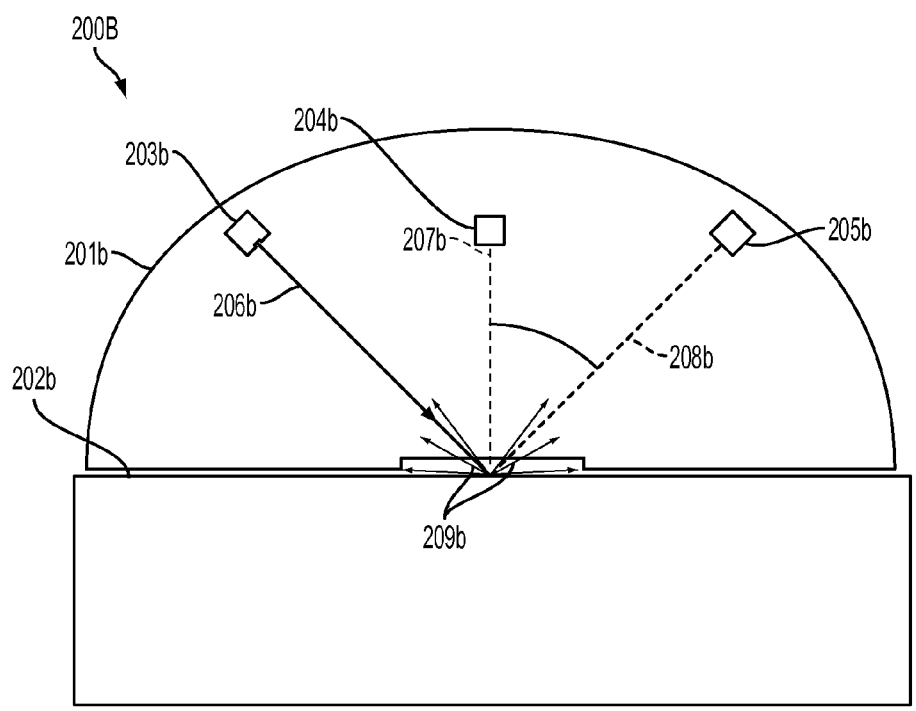

FIGS. 2A and 2B illustrate the differences between optical tracking devices 201a (which may be optical mice) and 201b operating (200A and 200B) respectively on a glossy surface 202a and a diffuse surface 202b. As can be seen in FIG. 2A, the optical tracking device 201a includes a light source 203a that emits light 206a with an angle of incidence θi at the surface 202a. The optical tracking device 201a also includes a sensor A 204a and a sensor B 205a. As illustrated, the surface 202a may diffuse a portion of the emitted light 206a. This diffuse light 209a may be received by the sensor A 204a and/or the sensor B 205a. However, the surface 202a also reflects a portion of the emitted light 206a with an angle of reflection θr. This specular light 208a is received by the sensor B 205a. As described above with respect to FIG. 1, the specular light 208a may be much greater in intensity than the diffuse light 209a. This may cause the sensor B 205a to saturate and not be utilizable to detect motion even when the sensor A 204a is not caused to saturate and it utilizable to detect motion.

By way of contrast, as can be seen in FIG. 2B, the optical tracking device 201b also includes a light source 203b that emits light 206b with an angle of incidence θ, at the surface 202b. The optical tracking device 201b also includes a sensor A 204b and a sensor B 205b. As illustrated, the surface 202a diffuses the emitted light 206b. This diffused light 209b may be received by the sensor A 204b and/or the sensor B 205b. However, even if the diffuse light 209b is greater in intensity than the diffuse light 209a illustrated in FIG. 2A, the surface 202b does not reflect specular light to the is received by the sensor B 205b. As such, neither the sensor A 204b nor the sensor B 205b may be caused to saturate. This, the optical tracking device 201b is capable of operation on the diffuse surface 202b whereas the optical tracking device 201a may not be capable of operation on the glossy surface 202a due to intensity differences in the diffuse light 209a and the specular light 208a.

Returning to FIG. 1, line 103 illustrates the intensity of diffuse light and specular light reflected off of glossy surfaces that has been reduced by one or more techniques of the present disclosure. As can be seen by line 103, utilization of techniques presented by the present disclosure may reduce the intensity the specular light such that the difference in intensity between the diffuse and specular light does not exceed the capabilities of one or more sensors of an optical tracking device. In this way, an optical tracking device may be provided that may be capable of operation on both glossy and diffused surfaces.

Figure 3A:
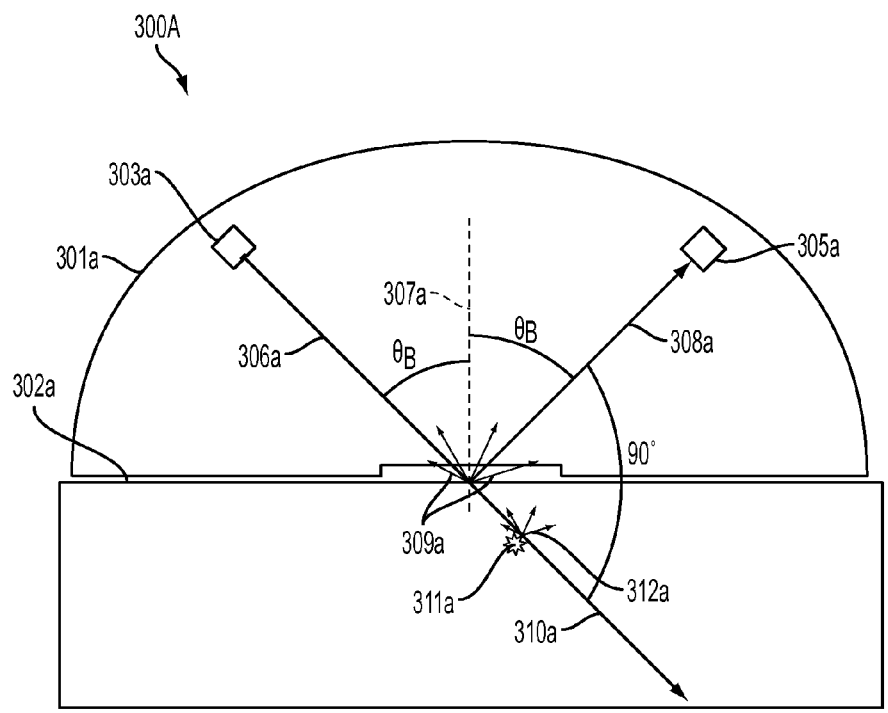
FIG. 3A is a side view of first implementation of an optical tracking device that may be capable of operation on both glossy and diffuse surfaces.

FIG. 3A is a side view of first implementation of an optical tracking device 301a that may be capable of operation 300A on both glossy and diffuse surfaces. As can be seen in FIG. 3A, the optical tracking device 301a includes a light source 303a (which may be at one laser, at least one incandescent bulb, at least one light emitting diode, at last one organic light emitting diode, and/or at least one other lighting source) that emits unpolarized light 306a with an angle of incidence corresponding to Brewster's angle (θB), which is approximately 53 degrees (such as 55 degrees, 54 degrees, and so on), at the surface 302a. The optical tracking device 301a also includes a sensor 305a. As illustrated, the glossy surface 302a may diffuse a portion of the unpolarized emitted light 306a. This diffuse unpolarized light 309a may be received by the sensor 305a. However, emitting light at the glossy surface 302a with an angle of incidence corresponding to Brewster's angle may cause only s-polarized light to be reflected by the glossy surface 302a (which may be reflected with an angle of reflection corresponding to Brewster's angle) whereas p-polarized light passes through (310a) the glossy surface 302a (which may also be diffused by non-glossy features 311a within the glossy surface 302a resulting in diffuse light 312a). As such, the intensity of the specular light 308a may be reduced. Thus, the sensor 305a may receive the diffuse unpolarized light 309a, diffuse p-polarized light 312a, and the s-polarized specular light 308a without causing the sensor 305a to saturate. In this way, the optical tracking device 301a may be capable of operating on glossy or diffuse surfaces.

It should be noted that although the optical tracking device 301a is described as capable of operation on diffuse surfaces with an angle of incidence and an angle of reflection corresponding to Brewster's angle, in some cases operation on a diffuse surface may cause the intensity of light received by the sensor 305a to be below the sensing capabilities of the sensor 305a. In such cases, the orientation of the light source 303a and/or the sensor 305a may be changed such that the angle of incidence and the angle of reflection correspond to Brewster's angle from another angle when light received by the sensor 305a exceeds the sensor's capabilities. Similarly, the orientation of the light source 303a and/or the sensor 305a may be changed such that the angle of incidence and the angle of reflection correspond to another angle from Brewster's angle when light received by the sensor 305a is below a threshold (such as the sensor's ability to detect).

In some implementations, the determination of whether or not light received by the sensor 305a exceeds the sensor's capabilities and/or is below the sensor's ability to detect may be performed utilizing data from the sensor 305a. In other implementations, the optical tracking device 301a may include one or more ambient light detectors (not shown) (which may be positioned near the sensor 305a) and data from the ambient light detector(s) may be utilized to determine whether or not the light exceeds the sensor's capabilities and/or is below the sensor's ability to detect.

Figure 3B:
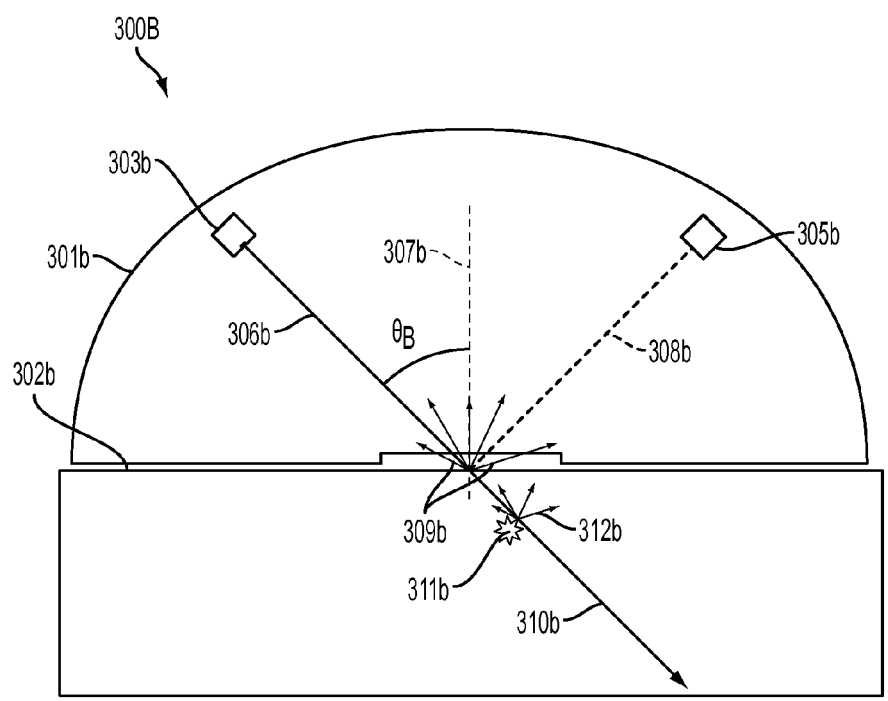
FIG. 3B is a side view of second implementation of an optical tracking device that may be capable of operation on both glossy and diffuse surfaces.

FIG. 3B is a side view of second implementation of an optical tracking device 301b that may be capable of operation 300B on both glossy and diffuse surfaces. As can be seen in FIG. 3B, the optical tracking device 301b includes a light source 303b (which may be at one laser, at least one incandescent bulb, at least one light emitting diode, at last one organic light emitting diode, and/or at least one other lighting source) that emits p-polarized light 306b with an angle of incidence corresponding to Brewster's angle (θB), which is approximately 53 degrees, at the surface 302b. The optical tracking device 301b also includes a sensor 305b. As illustrated, the glossy surface 302b may diffuse a portion of the p-polarized emitted light 306b and a portion of the p-polarized emitted light 306b passes through (310b) the glossy surface 302b (which may also be diffused by non-glossy features 311b within the glossy surface 302b resulting in diffuse light 312b). This diffuse unpolarized light 309b may be received by the sensor 305b. However, as all of the p-polarized emitted light 306b is either diffused or passes through the glossy surface, no portion is reflected (specular light) by the glossy surface 302b. As such, the intensity of the light received by the sensor 305b is reduced and the sensor 305b may receive the diffuse p-polarized light 309b and/or 312b without causing the sensor 305a to saturate. In this way, the optical tracking device 301b may be capable of operating on glossy or diffuse surfaces.

It should be noted that although the optical tracking device 301b is described as capable of operation on diffuse surfaces with 100% p-polarization an angle of incidence corresponding to Brewster's angle, in some cases operation on a diffuse surface may cause the intensity of light received by the sensor 305b to be below the sensing capabilities of the sensor 305b. In such cases, the percentage of p-polarization of the light emitted by the light source 303b in relation to the percentage of s-polarization may be varied. For example, the percentage of p-polarization of the light emitted by the light source 303b may be increased when light received by the sensor 305b exceeds the sensor's capabilities and the percentage of p-polarization of the light emitted by the light source 303b may be decreased when light received by the sensor 305b is below a threshold (such as the sensor's ability to detect). Similarly, the orientation of the light source 303b may be changed such that the angle of incidence corresponds to Brewster's angle from another angle when light received by the sensor 305b exceeds the sensor's capabilities and the orientation of the light source 303b may be changed such that the angle of incidence corresponds to another angle from Brewster's angle when light received by the sensor 305b is below a threshold (such as the sensor's ability to detect).

In some implementations, the determination of whether or not light received by the sensor 305b exceeds the sensor's capabilities and/or is below the sensor's ability to detect may be performed utilizing data from the sensor 305b. In other implementations, the optical tracking device 301b may include one or more ambient light detectors (not shown) (which may be positioned near the sensor 305b) and data from the ambient light detector(s) may be utilized to determine whether or not the light exceeds the sensor's capabilities and/or is below the sensor's ability to detect.

Figure 4A:
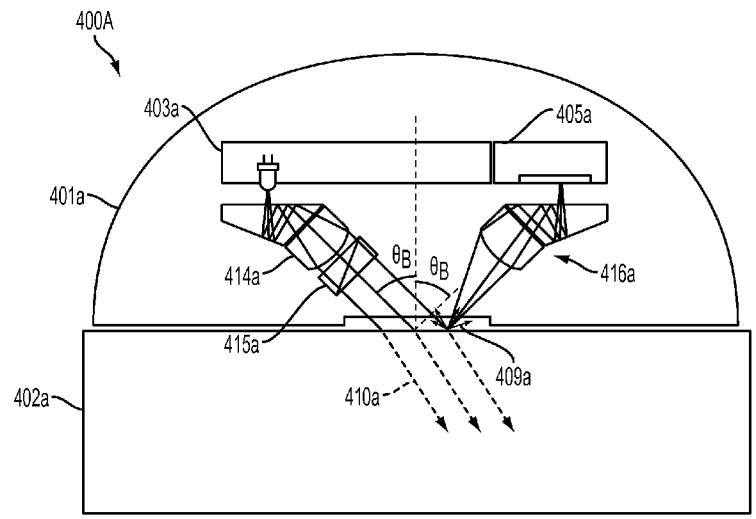
FIG. 4A is a side view of third implementation of an optical tracking device that may be capable of operation on both glossy and diffuse surfaces.

FIG. 4A is a side view of third implementation of an optical tracking device 401a that may be capable of operation 400A on both glossy and diffuse surfaces. As can be seen in FIG. 4A, the optical tracking device 401a includes a light source 403a that emits light that is collimated by a collimating optic component 414a, polarized by a polarizing optic component 415a (which may increase a p-polarized percentage of the light), and projected with an angle of incidence corresponding to Brewster's angle (θB) at the glossy table surface 402a.

As illustrated, the light source 403a is a light emitting diode. However, in other implementations, the light source 403a may be any kind of light source, such as at one laser (which may be utilized without the collimating optic component 414a), at least one incandescent bulb, at last one organic light emitting diode, and/or at least one other lighting source.

The optical tracking device 401a also includes an optical sensor 405a that receives light via an imaging optic component 416a. As illustrated, the glossy table surface 402a may diffuse a portion of the projected light, reflect (with an angle of reflection corresponding to Brewster's angle ($\theta_B$)) a portion of the projected light (such as the percentage that is p-polarized), and allow a portion of the projected light to pass through the glossy table surface 402a (such as the portion that is s-polarized). This diffuse and p-polarized reflected light may be received by the optical sensor 405a. As such, the intensity of the light received by the optical sensor 405a is reduced and the optical sensor 405a may receive the diffuse light and the p-polarized reflected light without causing the optical sensor 405a to saturate. In this way, the optical tracking device 401a may be capable of operating on glossy or diffuse surfaces.

It should be noted that although the optical tracking device 401a is described as capable of operation on diffuse surfaces with some percentage of p-polarization and angle of incidence and reflection corresponding to Brewster's angle, in some cases operation on a diffuse surface may cause the intensity of light received by the optical sensor 405a to be below the sensing capabilities of the optical sensor 405a. In such cases, the percentage of p-polarization of the light emitted by the light source 403a in relation to the percentage of s-polarization may be varied. For example, the percentage of p-polarization of the light emitted by the light source 403a may be increased by the polarization optic component 414a when light received by the optical sensor 405a exceeds the sensor's capabilities and the percentage of p-polarization of the light emitted by the light source 403a may be decreased by the polarization optic component 414a when light received by the optical sensor 405a is below a threshold (such as the sensor's ability to detect). Similarly, the orientation of the light source 403a and/or the optical sensor 405a may be changed such that the angle of incidence and the angle of reflection correspond to Brewster's angle from another angle when light received by the optical sensor 405a exceeds the sensor's capabilities and/or changed such that the angle of incidence and the angle of reflection correspond to another angle from Brewster's angle when light received by the optical sensor 405a is below a threshold (such as the sensor's ability to detect).

In some implementations, the determination of whether or not light received by the optical sensor 405a exceeds the sensor's capabilities and/or is below the sensor's ability to detect may be performed utilizing data from the optical sensor 405a. In other implementations, the optical tracking device 401a may include one or more ambient light detectors (not shown) (which may be positioned near the optical sensor 405a) and data from the ambient light detector(s) may be utilized to determine whether or not the light exceeds the sensor's capabilities and/or is below the sensor's ability to detect.

Figure 4B:
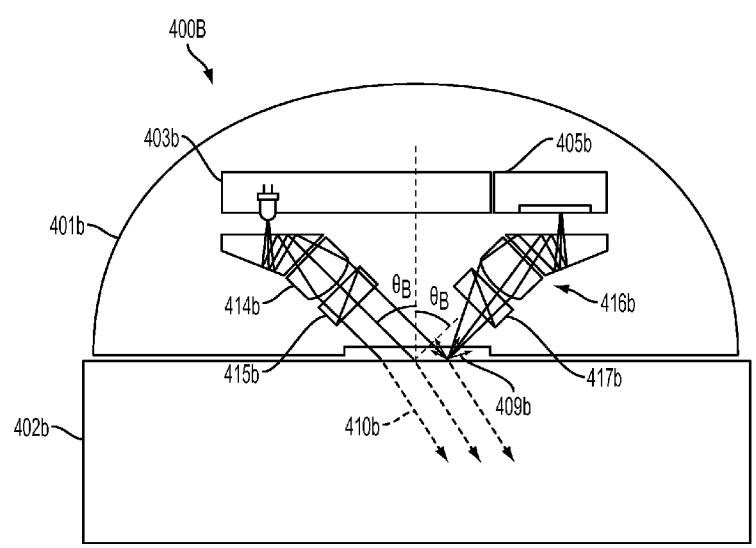
FIG. 4B is a side view of fourth implementation of an optical tracking device that may be capable of operation on both glossy and diffuse surfaces.

FIG. 4B is a side view of fourth implementation of an optical tracking device 401b that may be capable of operation 400B on both glossy and diffuse surfaces. As can be seen in FIG. 4B, the optical tracking device 401b includes a light source 403b that emits light that is collimated by a collimating optic component 414b, polarized by a polarizing optic component 415b (which may increase a p-polarized percentage of the light), and projected with an angle of incidence corresponding to Brewster's angle (θB) at the glossy table surface 402b.

As illustrated, the light source 403b is a light emitting diode. However, in other implementations, the light source 403b may be any kind of light source, such as at one laser (which may be utilized without the collimating optic component 414b), at least one incandescent bulb, at last one organic light emitting diode, and/or at least one other lighting source.

The optical tracking device 401b also includes an optical sensor 405b that receives light via an imaging optic component 416b that has been filtered by polarizer optic filtering component 417b. As illustrated, the glossy table surface 402b may diffuse a portion of the projected light, reflect (with an angle of reflection corresponding to Brewster's angle ($\theta_B$)) a portion of the projected light (such as the percentage that is p-polarized), and allow a portion of the projected light to pass through the glossy table surface 402b (such as part of the portion that is s-polarized). This diffuse and p-polarized reflected light may be received by the optical sensor 405b after additional filtering of remaining s-polarized portions of the light is performed by the polarizer optic filtering component 417b. As such, the intensity of the light received by the optical sensor 405b is reduced and the optical sensor 405b may receive the diffuse light and the p-polarized reflected light without causing the optical sensor 405b to saturate. In this way, the optical tracking device 401b may be capable of operating on glossy or diffuse surfaces.

It should be noted that although the optical tracking device 401b is described as capable of operation on diffuse surfaces with some percentage of p-polarization and angle of incidence and reflection corresponding to Brewster's angle, in some cases operation on a diffuse surface may cause the intensity of light received by the optical sensor 405b to be below the sensing capabilities of the optical sensor 405b. In such cases, the percentage of p-polarization of the light emitted by the light source 403b in relation to the percentage of s-polarization may be varied. For example, the percentage of p-polarization of the light emitted by the light source 403b may be increased by the polarization optic component 414b when light received by the optical sensor 405b exceeds the sensor's capabilities and the percentage of p-polarization of the light emitted by the light source 403b may be decreased by the polarization optic component 414b when light received by the optical sensor 405b is below a threshold (such as the sensor's ability to detect). Similarly, the orientation of the light source 403b and/or the optical sensor 405b may be changed such that the angle of incidence and the angle of reflection correspond to Brewster's angle from another angle when light received by the optical sensor 405b exceeds the sensor's capabilities and/or changed such that the angle of incidence and the angle of reflection correspond to another angle from Brewster's angle when light received by the optical sensor 405a is below a threshold (such as the sensor's ability to detect). Moreover, the percentage of s-polarization of the light blocked by the polarizer optic filtering component 417b may be increased when light received by the optical sensor 405b exceeds the sensor's capabilities and the percentage of s-polarization of the light blocked by the polarizer optic filtering component 417b may be decreased when light received by the optical sensor 405b is below a threshold (such as the sensor's ability to detect).

In some implementations, the determination of whether or not light received by the optical sensor 405b exceeds the sensor's capabilities and/or is below the sensor's ability to detect may be performed utilizing data from the optical sensor 405b. In other implementations, the optical tracking device 401b may include one or more ambient light detectors (not shown) (which may be positioned near the optical sensor 405b) and data from the ambient light detector(s) may be utilized to determine whether or not the light exceeds the sensor's capabilities and/or is below the sensor's ability to detect.

Figure 5:
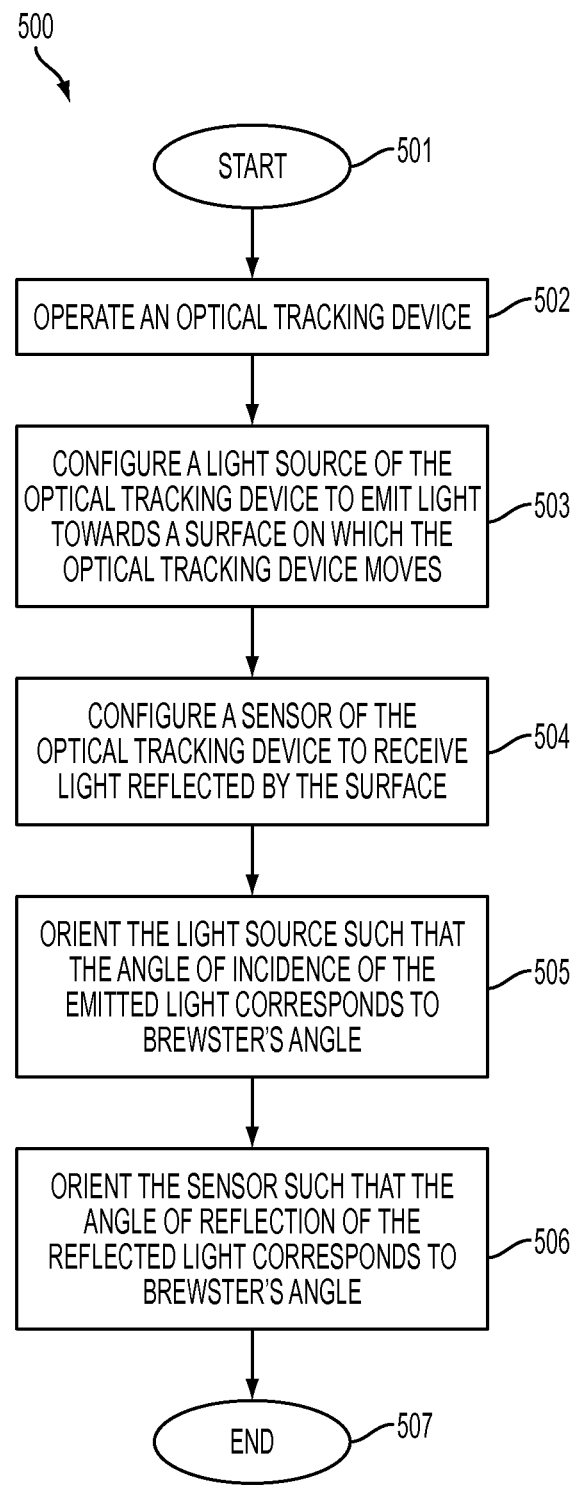
FIG. 5 is a flow chart illustrating a first example method for operating optical tracking devices. This method may be performed by the optical tracking devices of FIGS. 3A-4B.

FIG. 5 illustrates a first example method 500 for operating an optical tracking device. The method 500 may be performed by the optical tracking devices of FIGS. 3A-4B. The flow begins at block 501 and proceeds to block 502 where an optical tracking device is operated. The optical tracking device may include at least one light source and at least one sensor.

The flow then proceeds to block 503 where the light source is configured to emit light towards a surface on which the optical tracking device moves. The flow then proceeds to block 504 where the sensor is configures to receive light reflected by the surface.

The flow then proceeds to block 505. At block 505, the light source is oriented such that the angle of incidence of the emitted light corresponds to Brewster's angle. The flow then proceeds to block 506.

At block 506, the sensor is oriented such that the angle of reflection of the reflected light corresponds to Brewster's angle. The flow then proceeds to block 507 and ends.

Although the method 500 is illustrated and described above as including particular operations performed in a particular order, it is understood that other arrangements of various operations are possible without departing from the scope of the present disclosure. For example, in one or more implementations, blocks 505 and 506 may be performed simultaneously, in reverse order, and so on. By way of another example, block 501 may be omitted in one or more implementations.

Figure 6:
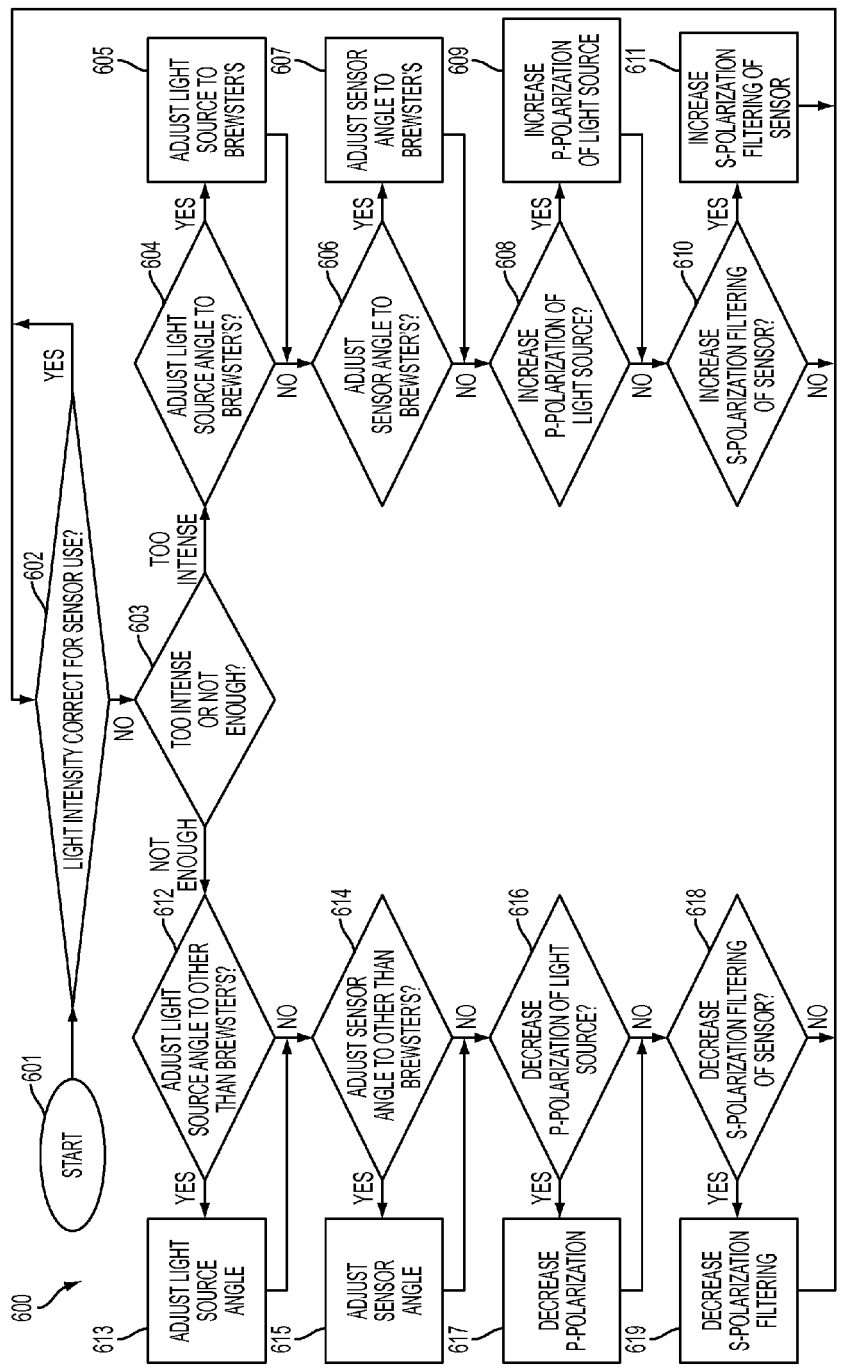
FIG. 6 is a flow chart illustrating a second example method for operating optical tracking devices. This method may be performed by the optical tracking devices of FIGS. 3A-4B.

FIG. 6 illustrates a second example method 600 for operating an optical tracking device. The method 600 may be performed by the optical tracking devices of FIGS. 3A-4B. The flow begins at block 601 and proceeds to block 602 where it is determined whether or not light intensity is correct for sensor use of an optical tracking device that includes a light source which emits light toward a surface on which the optical tracking device moves and a sensor that receives light reflected by the surface. If so, the flow returns to block 602 where it is determined whether or not the light intensity is correct for sensor use, otherwise, the flow proceeds to block 603.

At block 603, after it is determined that the light intensity is not correct for sensor use, it is determined whether the light is too intense for sensor use or not intense enough for sensor use. In some implementations, the determination of whether or not the light is too intense or not intense enough may be performed utilizing data from the sensor. In other implementations, the optical tracking device may include an ambient light detector (which may be positioned near the sensor) and data from the ambient light detector may be utilized to determine whether or not the light is too intense or not intense enough. If the light is too intense, the flow proceeds to block 604. Otherwise, the flow proceeds to block 612.

At block 604, after it is determined that the light is too intense, it is determined whether or not to adjust the angle of incidence for emitted light of the light source to Brewster's angle. If so, the flow proceeds to block 605 where the angle of incidence for emitted light of the light source is adjusted to Brewster's angle before the flow proceeds to block 606. Otherwise, the flow proceeds directly to block 606.

At block 606, it is determined whether or not to adjust the angle of reflection for reflected light received by the sensor to Brewster's angle. If so, the flow proceeds to block 607 where the angle of reflection for reflected light received by the sensor is adjusted to Brewster's angle before the flow proceeds to block 608. Otherwise, the flow proceeds directly to block 608.

At block 608, it is determined whether or not to increase the p-polarization of the light source. If so, the flow proceeds to block 609 where the p-polarization of the light source is increased before the flow proceeds to block 610. Otherwise, the flow proceeds directly to block 610.

At block 610, it is determined whether or not to increase the s-polarization filtering of the light received by the sensor. If so, the flow proceeds to block 611 where s-polarization filtering of the light received by the sensor is increased before the flow returns to block 602 and it is determined whether or not the light intensity is now correct for sensor use. Otherwise, the flow returns directly to block 602.

At block 612, after it is determined that the light is not intense enough, it is determined whether or not to adjust the angle of incidence for emitted light of the light source to an angle other than Brewster's angle. If so, the flow proceeds to block 613 where the angle of incidence for emitted light of the light source is adjusted to an angle other than Brewster's angle before the flow proceeds to block 614. Otherwise, the flow proceeds directly to block 614.

At block 614, it is determined whether or not to adjust the angle of reflection for reflected light received by the sensor to angle other than Brewster's angle. If so, the flow proceeds to block 615 where the angle of reflection for reflected light received by the sensor is adjusted to an angle other than Brewster's angle before the flow proceeds to block 616. Otherwise, the flow proceeds directly to block 616.

At block 616, it is determined whether or not to decrease the p-polarization of the light source. If so, the flow proceeds to block 617 where the p-polarization of the light source is decreased before the flow proceeds to block 618. Otherwise, the flow proceeds directly to block 618.

At block 618, it is determined whether or not to decrease the s-polarization filtering of the light received by the sensor. If so, the flow proceeds to block 619 where s-polarization filtering of the light received by the sensor is decreased before the flow returns to block 602 and it is determined whether or not the light intensity is now correct for sensor use. Otherwise, the flow returns directly to block 602.

Although the method 600 is illustrated and described above as including particular operations performed in a particular order, it is understood that other arrangements of various operations are possible without departing from the scope of the present disclosure. For example, blocks 604-611 and blocks 612-619 are illustrated and described as being performed in sequential order. However, in various implementations blocks 604-611 and/or blocks 612-619 may be performed in different orders and/or simultaneously.

Although the present disclosure has been illustrated and described as utilizing the techniques discussed herein for operating optical tracking devices such as optical mice, it is understood that this is for the purposes of example. In various cases, the techniques disclosed herein may be utilized in finger tracking and/or for other devices such as a tip of a stylus without departing from the scope of the present disclosure.

Further, although the present disclosure has been illustrated and described as utilizing the techniques discussed herein for operating optical tracking devices on glossy and diffuse surfaces, it is understood that this is for the purposes of example. Other utilization of the techniques disclosed herein is possible and contemplated without departing from the scope of the present disclosure. For example, the techniques discussed herein may be utilized when examining paper and/or other transparent materials are going from roll to roll in order to analyze whether or not the materials are slipping. By way of another example, the techniques discussed herein may be utilized to analyze glass surfaces such as screens, glass wafers, and so on for smudges, impurities, and/or other defects.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for operating an optical tracking device, the method comprising:
    configuring the optical tracking device with at least one light source that emits light towards at least one surface on which the optical tracking device moves and at least one sensor that receives light reflected off of the at least one surface, the optical tracking device tracks movement in relation to the at least one surface using the light received by the at least one sensor;
    orienting the at least one sensor such that an angle of reflection of the light received by the at least one sensor reflected off of the at least one surface corresponds to Brewster's angle in response to detection that an intensity of the light received by the at least one sensor exceeds a capability of the at least one sensor; and
    orienting the at least one sensor such that the angle of reflection of the light received by the at least one sensor reflected off of the at least one surface corresponds to a different angle than Brewster's angle in response to detection that the intensity of the light received by the at least one sensor is below a threshold.

2. The method of claim 1, further comprising:
    orienting the at least one light source such that an angle of incidence of the emitted light corresponds to Brewster's angle.

3. The method of claim 2, wherein said operation of orienting the at least one light source is performed in response to detection that the intensity of the light received by the at least one sensor exceeds the capability of the at least one sensor.

4. The method of claim 1, further comprising:
    polarizing the light emitted by the at least one light source towards at least one surface to increase a p-polarization percentage of the light emitted by the at least one light source.

5. The method of claim 4, further comprising:
    collimating the light emitted by the at least one light source towards at least one surface, wherein said operation of polarizing the light emitted by the at least one light source polarizes the collimated light.

6. The method of claim 4, wherein said operation of polarizing the light emitted by the at least one light source is performed in response to detection that the intensity of the light received by the at least one sensor exceeds the capability of the at least one sensor.

7. The method of claim 1, further comprising:
filtering the light received by the at least one sensor reflected off of the at least one surface to block at least part of a s-polarized portion of the light reflected off of the at least one surface.

8. The method of claim 7, wherein said operation of filtering the light received by the at least one sensor reflected off of the at least one surface to block at least part of a s-polarized portion of the light reflected off of the at least one surface is performed in response to detection that the intensity of the light received by the at least one sensor exceeds the capability of the at least one sensor.

9. The method of claim 1, wherein said operation of orienting the at least one sensor such that the angle of reflection of the light received by the at least one sensor reflected off of the at least one surface corresponds to Brewster's angle is performed in response to at least one additional sensor detecting that the intensity of the light received by the at least one sensor exceeds the capability of the at least one sensor.

10. The method of claim 1, wherein said operation of orienting the at least one sensor such that the angle of reflection of the light received by the at least one sensor reflected off of the at least one surface corresponds to the different angle than Brewster's angle in response to at least one additional sensor detecting that the intensity of the light received by the at least one sensor is below the threshold.

11. The method of claim 9, wherein the at least one additional sensor comprises an ambient light detector.

12. The method of claim 1, further comprising orienting the at least one light source such that an angle of incidence of the emitted light is other than Brewster's angle.

13. The method of claim 12, wherein said operation of orienting the at least one light source such that the angle of incidence of the emitted light is other than Brewster's angle is performed in response to detection that the intensity of the light received by the at least one sensor is below the threshold.

14. The method of claim 10, wherein the at least one additional sensor comprises an ambient light detector.

15. The method of claim 1, wherein the threshold corresponds to a minimum light intensity the at least one sensor is capable of detecting.

16. The method of claim 1, wherein said operation of orienting the at least one sensor such that the angle of reflection of the light received by the at least one sensor reflected off of the at least one surface corresponds to Brewster's angle reorients the at least one sensor to change the angle of reflection from an angle other than Brewster's angle to Brewster's angle.

17. The method of claim 1, wherein the optical tracking device comprises a mouse.

18. The method of claim 1, wherein the at least one light source comprises at least one laser, incandescent bulb, light emitting diode, or organic light emitting diode.

19. The method of claim 1, wherein the optical tracking device comprises a stylus.

20. The method of claim 1, wherein said operation of orienting the at least one sensor such that the angle of reflection of the light received by the at least one sensor reflected off of the at least one surface corresponds to the different angle than Brewster's angle reorients the at least one sensor to change the angle of reflection from Brewster's angle to the different angle.

* * * * *